United States Patent [19]

Charette et al.

[11] 4,234,144
[45] Nov. 18, 1980

[54] BASE VENT ASSEMBLY FOR ENTRY SPACE VEHICLES

[75] Inventors: Ray O. Charette, Fountain Valley; Elmer J. Yates, Irvine, both of Calif.

[73] Assignee: The United States of America as represented by the Secretary of the Air Force, Washington, D.C.

[21] Appl. No.: 955,062

[22] Filed: Oct. 24, 1978

[51] Int. Cl.³ .............................................. B64G 1/62
[52] U.S. Cl. .................................. 244/160; 220/366; 244/117 A
[58] Field of Search ............ 244/160, 162, 163, 117 A, 244/129.4, 129.1; 102/105; 62/DIG. 5, 241; 220/366; 89/30; 137/334; 52/302; 98/1.5

[56] References Cited
U.S. PATENT DOCUMENTS

| Re. 24,990 | 5/1961 | Del Mar | 98/1.5 |
|---|---|---|---|
| 2,196,546 | 4/1940 | Bowers | 244/129.5 |
| 2,312,155 | 2/1943 | Flaxman | |
| 2,657,819 | 11/1953 | Blackburn | 220/366 X |
| 3,082,611 | 3/1963 | Alvis et al. | 244/117 A X |
| 3,188,961 | 6/1965 | Scruggs et al. | 102/105 |
| 3,260,204 | 7/1966 | Wilkey | 102/105 |

Primary Examiner—Barry L. Kelmachter
Attorney, Agent, or Firm—Joseph E. Rusz; Jacob N. Erlich

[57] ABSTRACT

A base vent assembly for entry space vehicles having an access cover utilized in conjunction with a plurality of spaces and deflector member so as to establish a labyrinth vent adjacent the access opening of the entry vehicle. The labyrinth vent is created by carefully forming a passageway between the edge of the access opening and the access cover using spacers and carefully shaping of the innerface therebetween. Consequently a decrease in weight over a non-vented structure is created.

4 Claims, 4 Drawing Figures

BASE VENT ASSEMBLY FOR ENTRY SPACE VEHICLES

STATEMENT OF GOVERNMENT INTEREST

The invention described herein may be manufactured and used by or for the Government for governmental purposes without the payment of any royalty thereon.

BACKGROUND OF THE INVENTION

This invention relates generally to entry space vehicles or any other vehicle which is subject to severe aerodynamic heating, and, more particularly to a base vent assembly for utilization in conjunction with such a vehicle in order to relieve the aerodynamic base pressure and to vent pressure buildup from within the interior of the vehicle.

During many high speed flights and more specifically flight which includes entry of space vehicles into the atmosphere the large kinetic energy of entry vehicles is converted to heat by shock waves and air friction as the vehicle passes through the atmosphere. Generally the air surrounding the vehicle is heated to a temperature of many thousands of degrees. To overcome the detrimental effect on such high temperature careful vehicle design can result in more than 99% of this energy remaining in the surrounding air.

During entry into the atmosphere heat is transferred to the vehicle by two mechanisms: convection and radiation. Heating during entry from elliptic flight paths is predominantly convective. At the higher entry speeds characteristic of hyperbolic flight paths, however, the air adjacent the vehicle can become incandescent and radiative energy may become the dominant source of heating. Vehicles having large blunt faces cope most effectively with convective heating, but large-angle conical vehicles have been proposed for the higher speeds, at which radiation becomes a serious problem. Although such vehicles experience more convective heating than blunt-faced ones, their consequent large reductions of radiative heating could significantly reduce overall heating.

The three major means for heat shielding entry space vehicles are heat sinks, mass injection, and reradiation. In instances, however, where the vehicle is subject to severe aerodynamic heating, the vehicle must also be vented. In the past, separate vents have been provided in the vehicle body. These vents usually have been constructed by machining complex parts required because it is desirable that the vents be of a labyrinth type design. Such a design protects the interior of the vehicle from radiant heating and other effects of the hot aerodynamic environment in which the vehicle operates. The major drawbacks associated with individual vents heretofore in use included requirement of dedicated space in the base of the vehicle, great expense in the construction of the vents and the addition of weight to the vehicle which did not contribute to the structural integrity of the vehicle.

SUMMARY OF THE INVENTION

The instant invention overcomes the problems encountered in the past by providing a base vent assembly for entry space vehicles which enables the creation of a labyrinth vent at a location within the vehicle which is required for other purposes such as access to the interior of the vehicle.

The base vent assembly of this invention incorporates therein an access cover which is associated with an access opening located at the base of the entry space vehicle. The labyrinth vent is created by carefully forming a passageway between the edge of the access cover and the access opening using standoffs or spacers and by careful shaping of the innerface therebetween. In addition, lightweight material is utilized in this construction in conjunction with a molded air deflector. The basic concept provides a means of limiting differential pressure across the base-cover thus allowing a decrease in weight over non-vented structures. Furthermore, no expensive machining of separate parts is required and the vehicle is properly vented for operation in severe aerodynamic heating environments.

It is therefore an object of this invention to provide a base vent assembly for entry space vehicles which is capable of venting the interior of the vehicle to minimize the effects of excess heat and differential pressures thereon.

It is a futher object of this invention to provide a base vent assembly for entry space vehicles which is capable of holding access cover deflections to a minimum.

It is another object of this invention to provide a base vent assembly for entry space vehicles which incorporates therein sufficient insulation and labyrinth flow techniques to accommodate the severe heating considerations.

It is still another object of this invention to provide a base vent assembly for entry space vehicles which is economical to produce and which utilizes conventional currently available components that lend themselves to standard mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE DRAWING

DETAILED DESCRIPTION OF THE PREFERRED EMBODIMENT

Figure 1:
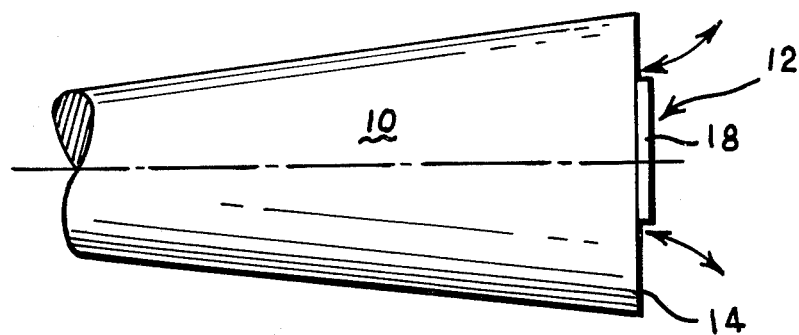
FIG. 1 is a segmented pictorial representation of an entry space vehicle having the base vent assembly of this invention incorporated therein.

Reference is now made to FIG. 1 of the drawing which shows in segmented fashion a conventional entry space vehicle 10 which incorporates therein the base vent assembly 12 of this invention. It should be realized, however, that although the instant invention is set forth within a typical entry space vehicle 10, this invention is also capable of use within any vehicle which is subject to severe aerodynamic heating and must therefore be vented.

Figure 2:
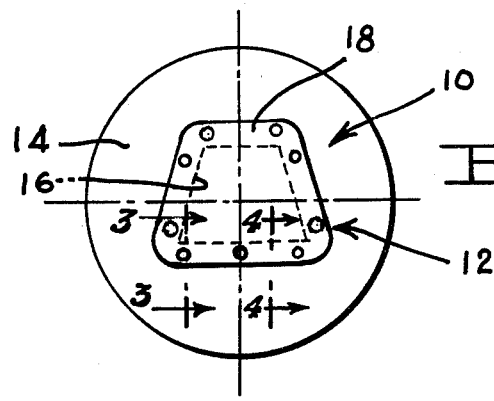
FIG. 2 is an end view of the entry space vehicle shown in FIG. 1 illustrating the position of the access cover utilized with the base vent assembly of this invention.

As more clearly shown in FIG. 2 of the drawing, vehicle 10 has located at the base structure 14 thereof an access opening 16 which is utilized in conjunction with the base vent assembly 12 of the instant invention. FIGS. 1 through 4 of the drawing further illustrate that base vent assembly 12 of this invention is made up of an access cover 18 so configurated as to cover access opening 16. Forming an essential aspect of the instant invention is the fastening arrangement of access cover 18 upon base structure 14 of vehicle 10. The relationship between access cover 18 and access opening 16 is clearly shown in detail in FIGS. 3 and 4 of the drawing.

Figure 3:
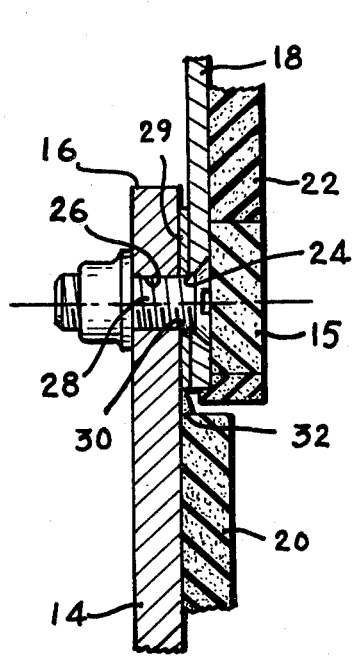
FIG. 3 is a cross-sectional view taken along line 3—3 of FIG. 2 illustrating the fastening arrangement of the access cover utilized with the base vent assembly of this invention.
Figure 4:
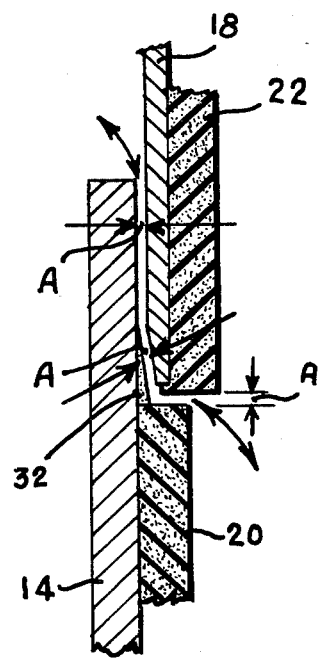
FIG. 4 is a cross-sectional view taken along line 4—4 of FIG. 2 illustrating the base vent assembly of this invention at a point along the access cover where the securing means are absent.

As shown in FIGS. 3 and 4 of the drawing, base 14 is generally made of any lightweight structural material such as aluminum onto which is secured in any conventional manner such as molding a base insulation made of any suitable material such as silicone rubber syntactic foam. This insulation material circumscribes access opening 16 leaving an area of the aluminum base structure 14 exposed for proper attachment of access cover 18 thereto. Access cover 18 is also made of any suitable lightweight material such as aluminum having an insulation material 22 molded thereon. This insulation material may also be in the form of a silicone rubber syntactic foam.

Located within and surrounding the periphery of access cover 18 are a plurality of holes 24 which are aligned with a plurality of openings 26 located in base structure 14 of vehicle 10. Such an arrangement allows for the passing therethrough of any suitable securing element such as bolts 28 which are utilized to removably secure access cover 18 to base structure 14. After the securing operation has taken place in the manner setforth hereinbelow the areas adjacent bolts 28 which have been exposed can now be sealed by any suitable insulation material 15.

In order to align access cover 18 with respect to opening 16 for the labyrinth base vent approach of this invention, a plurality of standoffs or spacers 29, made of any suitable material such as aluminum, are placed between base structure 14 of vehicle 10 and access cover 18. Each spacer 29 surrounds a respective bolt 28 in a similar fashion to a washer. Spacer 29 is configurated to allow passage of interior vehicle gas only between spacers 29. An aperture 30 in the center of each spacer 29 accommodates the passing therethrough of bolt 28.

In addition to spacers 29, the base vent assembly 12 of this invention utilizes therein a plurality of wedge-shaped deflector members 32 made of any suitable epoxy insulation. Members 32 adjacent spacers 29 form an exit path for vehicle gases. For proper venting operation it is essential that the distance A between base structure 14 and access cover 18 as well as between deflector members 32 and that portion of access cover 18 adjacent thereto, and the spacing between insulating material 20 and insulating material 22 be constant throughout the base vent assembly of this invention. A spacing of 0.03 inches for distance A provides optimum venting of vehicle 10. The spacing (0.03 reference) is variable to maintain the required pressure differential across the base cover. The spacing is dependent on the vehicle size, perimeter length of the vent opening and the specific trajectory of the reentry or space vehicle. After securement of access cover 18 takes place additional insulation material 15 covers bolts 28.

By combining the novel fastening arrangement of access cover 18 with the labyrinth vent design of this invention no expensive machining of separate parts is required with the instant invention and the vehicle is properly vented for operation in a severe aerodynamic heating environment.

Although this invention has been described with reference to a particular embodiment, it will be understood that this invention is also capable of further and other embodiments within the spirit and scope of the appended claims.

We claim:

1. In a vehicle which is subject to severe aerodynamic heating and having a base structure and an access opening located within said base structure, the improvement therein being in the form of a base vent assembly which is utilized in conjunction with said access opening, said base vent assembly comprising an access cover, said access cover being of a size sufficient to overlap said access opening within said base structure, means operably attached to said access cover for removably securing said access cover to said base structure, a plurality of spacers, each of said spacers being located adjacent each of said securing means for spacing said access cover a predetermined distance from said base structure, a plurality of wedge-shaped deflector members secured to said base structure interposed between said plurality of spacers, respectively, the portion of said access cover located adjacent said wedge-shaped deflector members having a shape which conforms to the shape of said wedge-shaped deflector members, said access cover being spaced from said wedge-shaped deflector members said predetermined distance, and said predetermined distance being constant throughout.

2. In a vehicle as defined in claim 1 further comprising means for insulating said base structure fixedly secured to said base structure and means for insulating said access cover fixedly secured to said access cover, said insulating means for said base structure and said access cover being spaced apart from each other said predetermined distance.

3. In a vehicle as defined in claim 2 wherein said securing means is in the form of a plurality of bolts which removably secure said access cover to said base structure.

4. In a vehicle as defined in claim 3 wherein means for insulating said bolts are removably secured adjacent said bolts.

* * * * *